Aug. 23, 1966   M. R. HILLS   3,267,610
APPLICATOR
Filed June 5, 1964   2 Sheets-Sheet 2
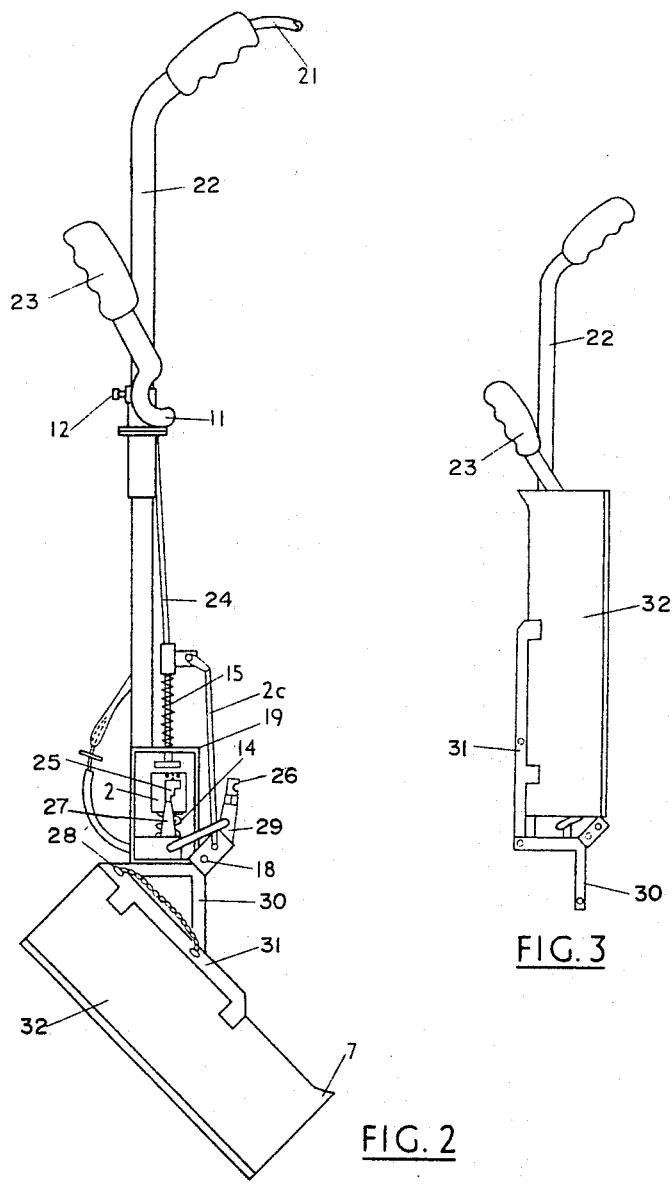
INVENTOR
MICHAEL ROBERT HILLS
By
Cushman, Darby & Cushman
ATTORNEYS United States Patent Office 3,267,610
Patented August 23, 1966

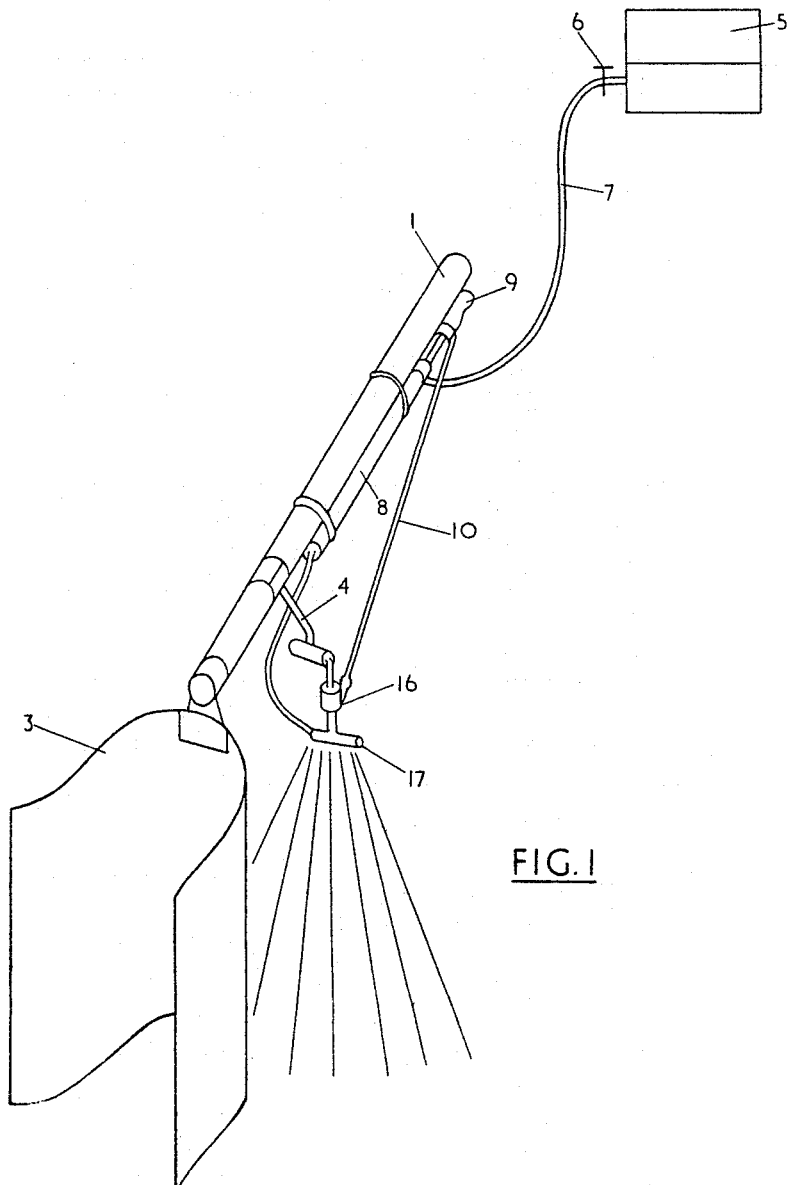

3,267,610
APPLICATOR
Michael Robert Hills, Fernhurst, near Haslemere, England, assignor to Imperial Chemical Industries Limited, London, England, a corporation of Great Britain
Filed June 5, 1964, Ser. No. 372,790
Claims priority, application Great Britain, June 5, 1963, 22,321/63
11 Claims. (Cl. 47—1.7)

This invention relates to an applicator for applying a biologically active liquid around the base of a growing plant and more particularly to an applicator which is adapted to prevent the biologically active liquid from making contact with the plant while it is being applied to the ground in the immediate vicinity of the plant.

When establishing forests it is desirable to keep the ground in the immediate vicinity of the base of very young trees free from weeds until the trees are about 18" high. This has usually been accomplished by hand weeding which is a time consuming and laborious process.

Attempts have been made to facilitate weeding by using an applicator, comprising a tank mounted on wheels, an applicator head situated below the tank and provided with orifices for discharging a liquid herbicide and flat guards extending downwards on each side of the device to prevent the liquid herbicide from splashing onto the young trees. The applicator is towed along between the rows of trees and applies liquid herbicide to weeds growing between the rows. Whilst this applicator has assisted in the destruction of weeds it suffers from a number of serious disadvantages. Thus the young trees are often difficult to see because of the surrounding weeds and they may not all be planted in rows which are very straight. As a consequence the device is unable to kill weeds growing in close proximity to and between the bases of the trees and these are the weeds which are most detrimental to the growth of the trees. A further disadvantage of this applicator is that it is wasteful in the use of liquid herbicide because it applies the herbicide to weeds growing sufficiently far away from the trees as not to harm them. Since many plantations are situated in terrain which is hilly or where water is scarce or difficult to transport the wasteful use of a liquid herbicide which consists largely of water constitutes an especially important disadvantage. A further disadvantage of an applicator of this kind is that it is unsuitable for use where the ground is very hilly or strewn with rocks.

By means of the present invention I provide an applicator which facilitates the application to a liquid herbicide to weeds growing in the immediate proximity of the base of young trees, and at the same time provides protection to the stem and foliage of the tree from contact with the liquid.

Accordingly, the present invention comprises an applicator for applying a liquid to the ground at the base of a tree comprising a handle member bearing towards one end thereof a shaped guard adapted to surround at least part of the tree and discharge means for applying the liquid to an area of the ground which is adjacent a surface of the guard remote from the tree.

The guard is generally of a concave shape and is connected to the end of the handle member with the concavity facing away from the latter. The shape of the guard may vary. For example it may comprise three sides of a rectangle, or be in the form of a V. Preferably however, the guard is U-shaped and is connected at the base of the U to the handle member with the arms of the U pointing away from the handle member. When the applicator is used the guard is held in a vertical position so that it is able to surround a small tree at least partially. In this position the lower edge of the guard rests on the ground. The guard is made preferably from a single sheet of light flexible material, for example aluminium or a synthetic polymer such as polyvinyl chloride.

The guard may be fixed permanently to the handle member or it may be detachable to allow replacement, either by a new one if the first one should become damaged, or by one of another shape according to the use to which the applicator is to be put. Thus if an applicator is to be employed for treating the growth in close proximity to young seedling trees the length of the arms of the guard and the extent of their spacing must be sufficient to enable the guard to surround, at least partially, not only the stem of the tree but also its branches. However, if the ground under older saplings is to be treated the guard may be required to protect only the stem of the tree, in which case the arms of the guard can generally be shorter and spaced more closely together. In a preferred form of applicator the guard is pivotally connected to the handle member so that when the applicator is to be transported or stored the guard may be folded back to a position in which it also serves to protect the discharge means.

The means for discharging the liquid includes an applicator head, provided with one or more orifices, situated preferably between the guard and the end of the handle member distant from the guard. An orifice may comprise a hole drilled in the applicator head or may be provided by a nozzle attached to the applicator head. A very satisfactory form of nozzle is one from which the liquid is discharged in the form of coarse droplets. In one preferred form of applicator the applicator head is connected pivotally to the handle member and is able to oscillate backwards and forwards in a vertical plane, to ensure that the maximum of ground coverage is obtained with a minimum of liquid at each application. Preferably the liquid is supplied to the orifice or orifices of the applicator head under pressure and this may be effected by supplying the liquid from a tank the contents of which are maintained under elevated pressure by suitable means, for example by compressed air, or alternatively, by providing a pump on the handle member. The pump may be one in which either the cylinder of the pump is maintained stationary and the piston moves or the pump cylinder moves and the piston is maintained stationary. The pump may be actuated by a handle provided with a conventional backward and forward working movement. However, since the applicator is generally intended to be a portable, hand operated, appliance in which an operator holds the handle of the applicator in one hand and operates the handle of the pump with the other a more convenient form of pump is one in which the pump handle comprises a lever attached to the handle member. In a preferred form of applicator the pump and the handle member of the applicator comprise separate entities secured to one another. However, the handle member may itself be the pump in which case the guard is attached towards that end of the pump which is remote from the handle of the pump.

In order to achieve economy in the use of liquid the applicator is preferably provided with means to supply a predetermined quantity of liquid to the ground at the base of each tree. When liquid is to be supplied from a tank the contents of which are maintained under elevated pressure the metering means may be constituted by a trigger valve which can be opened readily for a predetermined time. In general however, where a pump is employed the stroke of the pump is preferably capable of adjustment so as to be able to deliver a predetermined quantity of liquid at each action.

For a better understanding of the invention and to show how the same may be carried into effect, reference will now be made, by way of example, to the accompanying drawings in which:

FIGURE 1 is a perspective view of an applicator.

FIGURE 2 is a side view of a preferred form of applicator.

FIGURE 3 is a side view of the applicator illustrated in FIGURE 2 with the guard folded into its position for transport and storage of the applicator.

Referring to FIGURE 1 of the accompanying drawings a handle member carries at one end a guard 3 which is conveniently about 15" in height and U-shaped so as to be capable of partially surrounding a small tree. An applicator head 16 fitted with a spray nozzle 17 is connected by a pivot to an arm 4 which is attached to the handle member 1. Liquid herbicide is supplied from a tank 5 by way of a valve 6 through a flexible pipe 7 to a pump 8 which is secured to the handle member.

For purposes of operation the applicator is pushed against a tree so that the branches of the tree are embraced by the guard and compressed together within the guard thereby enabling the applicator head to be brought close to the stem of the tree. When the guard is in this position the spray is applied for 1–2 seconds by withdrawing and forcing forward the pump handle 9. During the action of withdrawing the pump handle 9 the applicator head, which is connected to the pump handle by an arm 10, is drawn towards the operator. On the forward stroke liquid herbicide is ejected from the nozzle and at the same time the applicator head moves in the direction of the guard so that the herbicide is distributed on the ground adjacent to the outer surface of the guard which is the surface remote from the tree. The guard is then placed against the opposite side of the tree and the process repeated. These two applications can result in an area of ground of about 3' x 3' being treated but this area may be varied accordingly to requirements by altering the height of the nozzle from the ground or by using a different form of nozzle.

Referring to FIGURE 2 of the drawing a hollow handle member 22 encloses a flexible pipe 21 to convey liquid from a tank (not shown) to a hand operated pump 2 which is connected to handle member.

A U-shaped guard 32 having a height of 15" and arms having a length of 6", is connected at two points to be a bracket 30. Connection 31, which is the lower of the two points of connection when the applicator is in the normal position for use, incorporates a removable pin which for convenience is chained to the bracket to prevent loss. When the pin is removed the guard is able to pivot about an upper point of connection 28 and be folded back to surround the lower end of the handle member and the pump as shown in FIGURE 3. The lower edge of the guard is provided with a flange 24 to provide an added protection to the base of the tree against contact with liquid.

The pump 2 comprises a fixed internal piston (not shown) and a movable cylinder. The cylinder is provided with a stepped recess 25 which co-acts with a stop 27, the combined effect of which is to enable the stroke of the pump, that is the extent of the movement of the cylinder, to be set to a predetermined valve. In order to operate the pump, a pump lever 23 is rotated away from the handle member. The lever is provided with a cam 11 which operates a push rod 24 terminating in a push rod head 13. As the pump lever is rotated away from the handle member the push rod head 13 presses the movable pump cylinder against the resistance of pump spring 14 and a push rod spring 15 and causes liquid to be supplied under pressure to an applicator head 29 and nozzle 26.

The applicator head 29 is attached by a pivot 18 to a pump housing 19 which forms part of the handle member. The applicator head is also connected by a push rod 20 to the pump push rod 24. Both ends of push rod 20 constitute pivoted connections and as the pump handle is rotated away from the handle member not only is the liquid forced from the nozzle but in addition the applicator head and the nozzle both rotate towards the guard 32 and the ground in the immediate vicinity of the base of the guard is sprayed with liquid.

The pump lever 23 is rotatably secured to the handle member and the direction from which the lever extends from the pump handle may be altered by slackening the retaining nut 12 and rotating the pump handle to the desired position. In this way an operator can choose in which hand he wishes to hold the applicator and with which hand he wishes to operate the pump lever.

In each of the applicators illustrated in the drawings the applicator head bears a single nozzle. Whilst for most purposes this is sufficient, more than one nozzle may be employed. Thus the applicator head can comprise a boom which extends from either or both sides of the applicator and which is provided with a plurality of orifices or nozzles.

Whilst the present device is intended primarily as a light, portable appliance for use in the cultivation of young trees larger appliances are also embraced within the scope of the invention which may be provided with wheels and be, or form part of, mechanically propelled vehices.

Also envisaged within the scope of the invention is a portable handle member bearing towards one end thereof means to support a guard said member incorporating a pump and an applicator head carrying either a nozzle or having an orifice formed therein said applicator head being pivotally connected to both the handle member and the pump whereby when the pump is actuated the applicator head is caused to move about its pivotal connections. The handle member is preferably for use in combination with a shaped guard which is adapted to surround at least part of a tree. However, it may also be used with guards of a different shape. Thus a flat guard may be more satisfactory in the treatment of weeds in market gardens, where seedlings which are growing in rows may have little or no space between adjacent seedlings within the rows.

The present devices may be used for facilitating the application of a wide variety of biologically active liquids. However, they are of especial use in connection with the application of bipyridylium herbicides which have the property of becoming rapidly deactivated when brought into contact with soil. As a consequence these herbicides may be applied to the ground almost right up to the stem of the plant provided the liquid is not allowed to splash onto it. Examples of such herbicides are sold under the registered trademarks Gramoxone and Reglone.

What I claim is:

1. An applicator for applying a liquid to the ground at the base of a tree comprising a handle member bearing towards one end thereof a shaped concave guard adapted to surround at least part of the tree, means for predetermining the volume of liquid to be discharged and a movable applicator head for applying a traversing stream of said predetermined amount of the liquid to that part of the ground which is adjacent a surface of the guard remote from the tree.

2. An applicator according to claim 1 wherein the guard is made of flexible material.

3. An applicator according to claim 1 wherein the guard is connected pivotally to the handle member.

4. An applicator according to claim 1 wherein the handle member is provided with means for expressing liquid from the movable applicator head.

5. An applicator according to claim 4 wherein the means for expressing liquid from the movable applicator head is a pump.

6. An applicator according to claim 5 wherein the pump is operated by a lever connected to the handle member.

7. An applicator according to claim 6 wherein the lever is connected rotatably to the handle member.

8. An applicator according to claim 1 wherein the means for predetermining the volume of liquid to be discharged is a pump, having a stroke the extent of which can be predetermined.

9. An applicator according to claim 1 wherein the movable applicator head includes an applicator head mounted on a pivot, said head being rotatable around said pivot.

10. An applicator according to claim 9 wherein the means for expressing the liquid from the movable applicator head includes means for causing the applicator head to rotate about said pivot simultaneously with the expressing of the liquid.

11. An applicator for applying liquid to the ground at the base of a tree comprising a portable handle member bearing towards one end thereof a supporting means, a guard, said guard being attached to said supporting means, said handle member incorporating a pump and an applicator head, said applicator head being pivotally connected to both the handle member and the pump whereby when the pump is actuated the applicator head is caused to move about its pivotal connections, said guard being adapted to surround a substantial part of the circumference of said tree.

No references cited.

ABRAHAM G. STONE, *Primary Examiner.*

R. E. BAGWILL, *Assistant Examiner.*